UNITED STATES PATENT OFFICE.

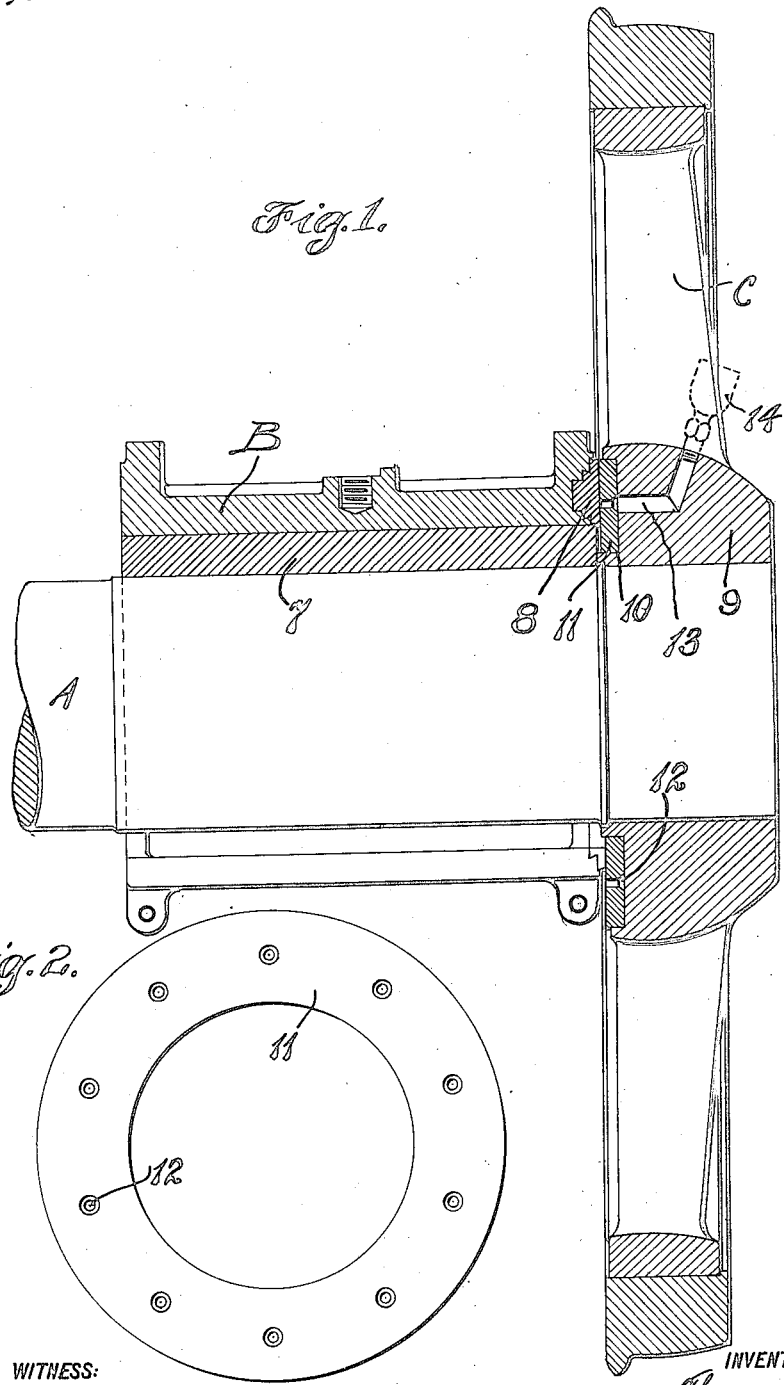

THOMAS PAXTON, OF EL PASO, TEXAS.

LATERAL-WEAR REDUCER FOR LOCOMOTIVES.

1,372,774.  Specification of Letters Patent.  Patented Mar. 29, 1921.

Application filed September 24, 1919. Serial No. 325,904.

*To all whom it may concern:*

Be it known that I, THOMAS PAXTON, a citizen of the United States, residing at El Paso, in the county of El Paso and State of Texas, have invented certain new and useful Improvements in Lateral-Wear Reducers for Locomotives, of which the following is a specification.

This invention relates to means for preventing or reducing lateral wear on locomotive driving wheels and it has for one of its primary objects the reduction of the lateral wear to a minimum thereby greatly reducing the expense and the losses incident to the withdrawal of the locomotive out of service to drop out the driving wheels and take up the lateral wear. In this connection, it is not at all uncommon to drop out the driving wheels one or more times between general shoppings of the locomotive to take up the lateral wear and those familiar with this art will readily understand what is involved in such practice.

The foregoing, together with such other objects as may hereinafter appear, I obtain by means of a construction which I have illustrated in preferred form in the accompanying drawings, wherein—

Figure 1 is a cross section through a locomotive driver and a driving box, illustrating the application of my invention; and Fig. 2 is a side elevation of a floating hub liner I employ in carrying out my invention.

Referring now to the drawing, the reference letter A indicates a driving axle, journaled in the driving box B, and the reference letter C indicates a driving wheel. The driving box B, which may be of any preferred standard type, is provided with the usual brass 7 and may, or may not be provided with a liner 8, as desired. In the inner face of the hub 9 of the driving wheels, I provide an annular recess 10 adapted to receive a floating hub liner or ring-like member 11, such liner being provided with a plurality of suitably spaced apertures 12 extending therethrough and preferably enlarged or reamed out on the hub face of the liner as shown. A duct 13 is formed in the hub of the driving wheel, the inner end of which is located the same distance from the center of the axle as the apertures 12. The outer end of the duct 13 is threaded to receive the neck of a grease or other lubricating cup 14, which is preferably of the compression type.

The liner 11 is preferably made of steel, finished on all sides, and it fits the recess 10 sufficiently loosely to float as the driving wheel revolves, that is to say, it revolves at a much slower speed than the wheel for the reason that it bears against the driving box which is stationary. This difference in speed of revolution successively brings the apertures 12 into alinement with the duct 13 and the lubricant (preferably soft grease), not only lubricates the hub face of the liner but also works through the apertures 12 and lubricates the driving box face of the liner as well as the face of the driving box. The shape of the apertures 12 is such as to assist in forcing the lubricant through the liner to the driving box face as relative rotation takes place. It will be apparent that while the surfaces of the hub liner will be thoroughly lubricated there will be no wastage of lubricant to speak of.

I have found by this arrangement that the wear is so much reduced that I am enabled to entirely eliminate the dropping of the driving wheels to take up the lateral wear between general shoppings or overhaulings of the locomotive, whereas with heavy power it is frequently necessary to drop the wheels at least once or twice between general shoppings, as before pointed out. In applying the liners to new work, I prefer to forge the liners in a single piece as shown and place them on the axle before the wheel. When applying the device to engines already fitted up, the liner is forged and turned and then sawed in two on one side, after which it is heated on the back opposite the cut, then twisted and shoved over the axle into the recess in the hub, after which it is driven true to shape. I have found this apparently difficult operation to work out very successfully in practice.

Another method of applying these floating hub liners to axles which may be used if desired, is to part the liner on both sides, clamp the parts in place and then weld the parts together which may be done either with the use of oxy-acetylene flame or by an electric process. The device may also be applied in some cases if desired by forming the member in two halves fitted together with mechanical accuracy so as not to waste the grease at the joint and allowing the liner to run in the recess in that condition.

It will also be noted that whatever wear there is, takes place uniformly by reason of the fact that the liner floats.

I claim:

1. The combination of a driving wheel member, a driving box member, a floating liner therebetween having a plurality of apertures therethrough arranged at equal distances from the center of the wheel and a lubricant supply passage in one of said members adapted to aline with each of said apertures in turn as the liner rotates.

2. The combination of a driving wheel member, a driving box member, a floating liner therebetween having a plurality of apertures therethrough, and a lubricant supply passage in one of said members adapted to supply lubricant to said liner through said apertures successively as the liner rotates.

In testimony whereof I have hereunto signed my name.

THOMAS PAXTON.